April 7, 1931. A. O. ENGBERG ET AL 1,799,962
FLOOR POLISHER
Original Filed June 19, 1928
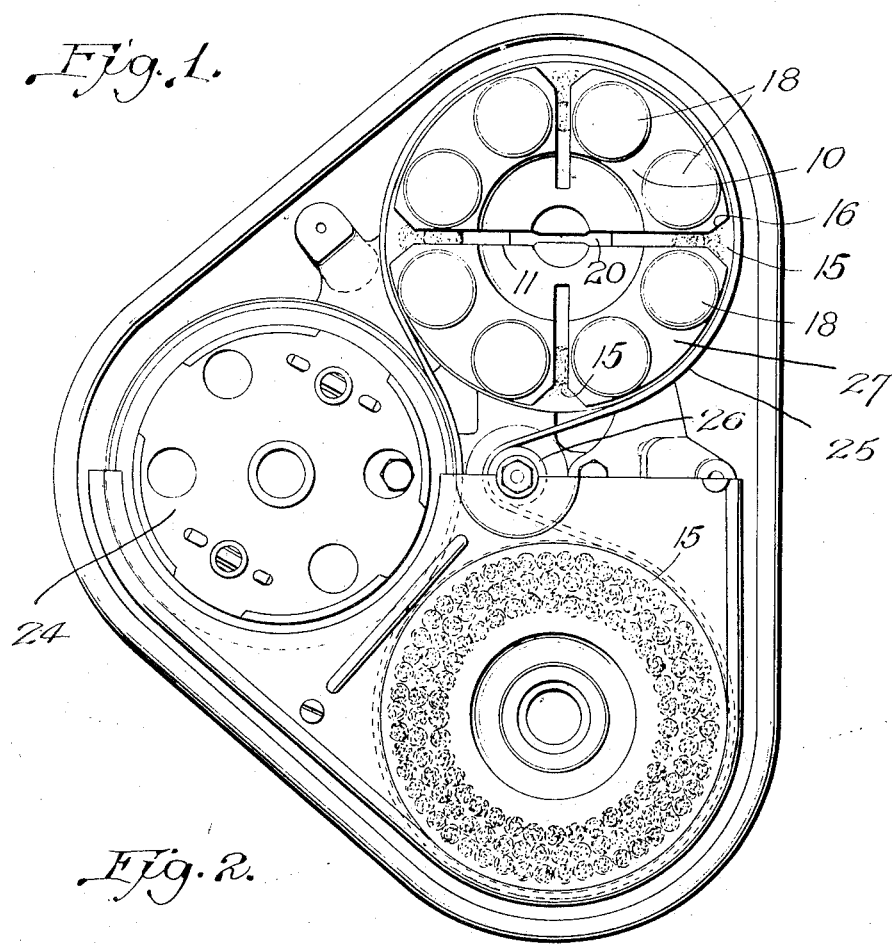
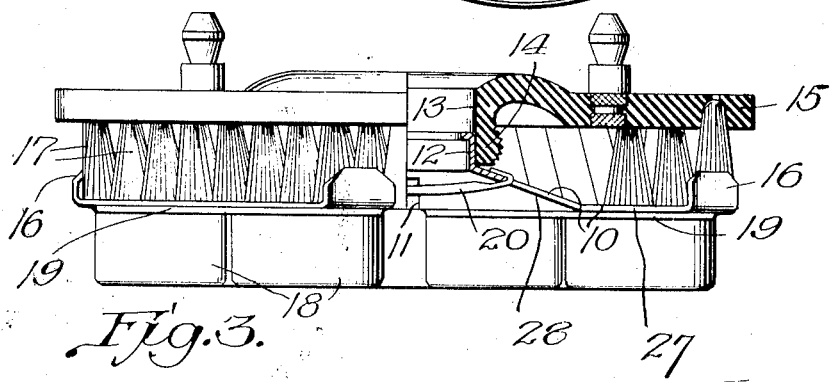
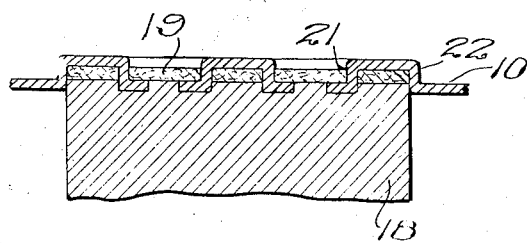
Inventors.
Axel Olof Engberg
Tord Erik Daniel Bilde
By Nathaniel Frucht
their Attorney.

Patented Apr. 7, 1931

1,799,962

UNITED STATES PATENT OFFICE

AXEL OLOF ENGBERG AND TORD ERIK DANIEL BILDE, OF STOCKHOLM, SWEDEN, ASSIGNORS TO INVENTIA PATENT-VERWERTUNGS-GESELLSCHAFT, OF SCHAFFHAUSEN, SWITZERLAND, A CORPORATION OF SWITZERLAND

FLOOR POLISHER

Original application filed June 19, 1928, Serial No. 286,663, and in Germany June 14, 1927. Renewed February 27, 1930. Divided and this application filed December 7, 1928. Serial No. 324,475.

This application is a division of our copending application, Serial No. 286,663, filed June 19th, 1928, for Improvements in floor polishers.

The present invention relates to apparatus for brushing and polishing floors, and more particularly to motor operated polishers having rotatable brushes and adapted to be moved over the floor during use by a control handle grasped by the operator, and specifically resides in providing novel and improved waxing devices for use in connection with such apparatus. In one phase of the invention it consists in the provision of holding means for pieces of wax providing elastic mounting for the pieces of wax permitting the pieces of wax to have relative movement.

The above and other features of the invention will be more evident from the following description taken in conjunction with the accompanying drawing illustrating one embodiment of the invention.

Referring to the drawing:

Fig. 1 is a view of the under side of a floor polisher, partly in section, showing a brush carrier, a brush disk in position, and a waxing disk in position;

Fig. 2 is a side view of the waxing disk, partly in section, showing the disk secured in position on the brush; and Fig. 3 is a detail section of part of one form of wax-holding means.

While the waxing disk has been disclosed in the parent application above referred to as applied to a floor polisher having three rotatable members for carrying brush and waxing elements, and is so shown in this application, it will be understood that the waxing disk is applicable to other types of floor polishers and that various forms of waxing disks are possible within the scope of the appended claims.

The floor polisher to which the waxing disks are applied, in the specific form used for purposes of illustration, comprises three rotatable carrier disks 24 mounted to rotate about parallel axes and rotated by means of a belt 25 passing in contact with the carrier disks and around a driving pulley 26, the driving pulley being driven by an electric motor. The belt 25 passes around two of the carrier disks and between the other carrier disk and the driving pulley so that one of the disks is rotated in the opposite direction to the direction of rotation of the other two. Brush disks 15 are held by the carrier disks and are rotated thereby. When waxing is to be performed, the waxing disks, in the preferred form, are secured to the brush disks. There are thus three waxing units and each waxing unit is rotated with the brush disk to which it is attached and each brush disk is rotated by the carrier disk to which it is attached. For further explanation of the specific floor polisher in general, reference may be had to the parent application above referred to.

One of the preferred waxing disks is shown, in bottom view, in Fig. 1 and side and sectional view in Fig. 2. The waxing disk comprises a sheet metal plate 10 having a main annular portion 27, to which the pieces of solid wax are attached, and a central upwardly inclined portion 28. The portion 27 of the metal plate is, in general, in one plane. Radial slots 11 are provided which divide the waxing disk into segments and which provide resiliency and elasticity whereby pieces of the wax can have relative up and down movement as they move over the floor. It will be seen that the parts separated by slots are resiliently yieldable relative to each other.

At the inner part of the inclined portion 28 of the disk 10 is a collar 12, which extends upwardly and is adapted to fit into a recess 13 in the center of the brush disk 15 and within the hand grasp portion 14. Corners 16 of plate 10 are bent upwardly and engage bristles 17 to assist in holding the waxing disk to the brush disk.

A number of cylindrical pieces of wax 18 are attached to the under side of the waxing disk. Felt pieces 19 or other suitable fabric pieces are fixed or pasted to the upper sides of the wax pieces. These fabric members 19 are in turn fastened to plate 10 by means of tongues 21 stamped out of the plate, or by other suitable means. Preferably, the plate 10 has cylindrical depressions 22 which receive the fabric and the cylindrical pieces of wax. In order to facilitate the application of the waxing disks to the brush disks and the removal thereof from the brush disks, plate 10 is provided with a handle 20, preferably soldered to the plate. The solid wax pieces may be resiliently connected to the waxing disk or the waxing disk itself may be connected directly, in any convenient elastic manner, with the rotating mechanism, such as the carrier disks, instead of being attached to the brush disks.

While the preferred embodiment of the invention and certain preferred details of construction are herein shown and described, it is apparent that changes may be made and various features may be used without others without departing from the spirit of the invention.

What we claim is:

1. In a waxer for use with a floor polisher, a resilient disk comprising a series of partially separated segments and means for securing wax to said segments.

2. In a waxer for use with a floor polisher, a disk having radial slots therein forming partially separated segments and means for securing wax to said segments.

3. In a waxer for floor polishers, a resilient disk, depressions therein and intermediate fabric means to secure wax elements to the bottoms of said depressions.

4. In a floor polisher, the combination with a driven member of a wax holder adapted to be fitted to said driven member to move therewith and comprising a substantially flat plate member adapted to carry a plurality of individual pieces of solid wax and having portions resiliently yieldable relative to each other to permit the pieces of wax to have relative up and down movement.

5. In a floor polisher, the combination with a driven member of a wax holder adapted to be fitted to said driven member to move therewith and comprising wax-retaining means adapted to carry a plurality of individual pieces of solid wax in contact therewith, the contact surfaces between the individual pieces of wax and the wax holder being in substantially the same plane and the portions on which the pieces of wax are carried being yieldingly disposed to permit the pieces of wax to have relative up and down movement.

6. In a floor polisher, the combination with a driven member of a wax holder adapted to be fitted to said driven member to move therewith and comprising a substantially flat plate member adapted to carry a plurality of individual pieces of solid wax and slotted to form partially separated segments whereby wax pieces held by the holder are resiliently mounted.

7. In a floor polisher, the combination with a driven member of a wax holder adapted to be fitted to said driven member to move therewith and comprising a substantially flat plate member adapted to carry a plurality of individual pieces of solid wax and cut away to form partially separated portions whereby wax pieces carried by the wax holder are resiliently mounted.

8. In a floor polisher, the combination with a driven member of a wax holder adapted to be fitted to said driven member to move therewith and comprising metal wax-retaining means adapted to carry a plurality of individual pieces of solid wax in contact therewith, the contact surfaces between the individual pieces of wax and the wax holder being in substantially the same plane and the portions on which the pieces of wax are carried being yieldingly disposed to permit the pieces of wax to have relative up and down movement.

In testimony whereof we affix our signatures.

AXEL OLOF ENGBERG.
TORD ERIK DANIEL BILDE.